United States Patent
Shima et al.

(10) Patent No.: US 10,608,863 B2
(45) Date of Patent: Mar. 31, 2020

(54) TRANSMISSION CONTROL APPLICATION SUPPORTING TCP FAST OPEN

(71) Applicant: SONY INTERACTIVE ENTERTAINMENT INC., Tokyo (JP)

(72) Inventors: Koji Shima, Kanagawa (JP); Makoto Ikushima, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 80 days.

(21) Appl. No.: 15/659,646

(22) Filed: Jul. 26, 2017

(65) Prior Publication Data
US 2018/0034681 A1 Feb. 1, 2018

(30) Foreign Application Priority Data
Jul. 26, 2016 (JP) .................................. 2016-146120

(51) Int. Cl.
*H04L 29/06* (2006.01)
*H04L 12/841* (2013.01)
*H04L 12/807* (2013.01)
*H04L 12/823* (2013.01)
*H04L 12/801* (2013.01)

(52) U.S. Cl.
CPC .. *H04L 29/06115* (2013.01); *H04L 29/06755* (2013.01); *H04L 47/193* (2013.01); *H04L 47/27* (2013.01); *H04L 47/283* (2013.01); *H04L 47/32* (2013.01); *H04L 69/16* (2013.01); *H04L 69/163* (2013.01)

(58) Field of Classification Search
CPC . H04L 29/06115; H04L 47/32; H04L 47/283; H04L 47/27; H04L 47/193; H04L 29/06755; H04L 69/16
See application file for complete search history.

(56) References Cited

U.S. PATENT DOCUMENTS

| | | | | |
|---|---|---|---|---|
| 2010/0182909 A1* | 7/2010 | Sagara | ..................... | G06F 9/505 370/235 |
| 2010/0214975 A1* | 8/2010 | Kwak | ..................... | H04L 63/08 370/328 |
| 2014/0325064 A1* | 10/2014 | Johansson | ............... | H04L 47/12 709/225 |

FOREIGN PATENT DOCUMENTS

WO  WO-2017220149 A1 * 12/2017

OTHER PUBLICATIONS

Cheng et al., "TCP Fast Open (RFC7413)", Dec. 1, 2014, Internet Engineering Task Force (Year: 2014).*

* cited by examiner

*Primary Examiner* — Afshawn M Towfighi
*Assistant Examiner* — Justin T Van Roie
(74) *Attorney, Agent, or Firm* — HEA Law PLLC (57) ABSTRACT

A transmission control device includes a delaying section and a transmitting section. When an application program calls a connect function, the delaying section delays transmission of a synchronize packet in response to the calling of the connect function. Upon calling of a transmit function by the application program while the transmission of the synchronise packet is being delayed, the transmitting section transmits the synchronise packet including transmission target data in response to the calling of the transmit function.

5 Claims, 4 Drawing Sheets

TRANSMISSION CONTROL APPLICATION SUPPORTING TCP FAST OPEN

BACKGROUND

The present disclosure relates to a transmission control device, a transmission control method, and a transmission control program.

A procedure called three-way handshaking has been known as the procedure for establishing a socket-to-socket connection under the transmission control protocol (TCP), the connection being known as the TCP connection.

In three-way handshaking, a client requesting communication with a server transmits a synchronize (SYN) packet to the server, for example. On receiving the SYN packet, the server transmits a synchronize-acknowledge (SYN+ACK) packet to the client. Upon receipt of the SYN+ACK packet, the client transmits to the server an acknowledge (ACK) packet and transmission target data such as a hypertext transfer protocol (HTTP) request. In this manner, the transmission target data is transmitted from the client to the server. The time required for the client to transmit the SYN packet to the server and to receive the SYN+ACK packet from the server is called a round-trip time (RTT) in three-way handshaking.

The request for comments (RFC) 7413 describes the technique called TCP fast open (TFO) as a typical technique for speeding up TCP-based communication related to three-way handshaking.

The TFO involves having a TCP option included in the SYN packet transmitted from the client to the server in three-way handshaking, the TCP option indicating that the TFO is enabled. The server supporting the TFO and having received the SYN packet transmits to the client the SYN+ACK packet including data called cookies. Upon receipt of the SYN+ACK packet, the client transmits the ACK packet and transmission target data to the server.

Thereafter, when communication between the same sockets is resumed, the client transmits to the server the SYN packet that includes the cookies previously received from the server and the transmission target data. The TFO thus allows the client having received the cookies from the server to transmit the transmission target data to the server without waiting for the receipt of the SYN+ACK packet in three-way handshaking. This eliminates the communication time corresponding to one RTT in three-way handshaking, thereby improving communication rate.

SUMMARY

There are application programs not supporting communication based on the TFO specifications. One way to enable such application programs to perform TFO-based communication may be to modify the application programs in a manner satisfying the TFO specifications. For example, the RFC 7413 describes techniques for implementing TFO-based communication.

However, modifying an application program in a manner meeting the TFO specifications requires first identifying all parts of the program to be modified and then actually modifying all identified program parts. This is a time-consuming exercise.

The present disclosure has been made in view of the above circumstances. It is desirable to provide a communication control device, a communication control method, and a communication control program for enabling an application program to communicate in accordance with the TFO specifications without modification of the application program.

In solving the above problems and according to one embodiment of the present disclosure, there is provided a transmission control device including a delaying section configured such that when an application program calls a connect function, the delaying section delays transmission of a SYN packet in response to the calling of the connect function, and a transmitting section configured such that upon calling of a transmit function by the application program while the transmission of the SYN packet is being delayed, the transmitting section transmits the SYN packet including transmission target data in response to the calling of the transmit function.

Preferably, the embodiment above may further include a round-trip time identifying section configured to identify a round-trip time constituting a time period from the time the SYN packet is transmitted until a SYN+ACK packet is received in three-way handshaking, and a transmission time lag identifying section configured to identify a transmission time lag constituting a time period from the time the connect function is called by the application program until the transmit function is called. The delaying section may control whether or not to delay the transmission of the SYN packet in response to the calling of the connect function in accordance with the result of a comparison between the round-trip time and the transmission time lag.

Preferably in the above embodiment, the delaying section may control whether or not to delay the transmission of the SYN packet in response to the calling of the connect function to connect with each of multiple communication devices in accordance with the result of the comparison between the round-trip time and the transmission time lag upon communication with each communication device.

Preferably in the above embodiment, the delaying section may control whether or not to delay the transmission of the SYN packet in response to the calling of the connect function to connect with each of multiple sockets in accordance with the result of the comparison between the round-trip time and the transmission time lag upon communication with each socket.

Preferably, the embodiment above may further include a round-trip time identifying section configured to identify a round-trip time constituting a time period from the time the SYN packet is transmitted until a SYN+ACK packet is received in three-way handshaking. The delaying section may delay the transmission of the SYN packet from the time the connect function is called until the round-trip time elapses.

Preferably in the above embodiment, when the number or times the transmit function is not called while the transmission of the SYN packet is being delayed exceeds a predetermined count, the transmitting section may transmit the SYN packet not including a TCP option indicating that the TFO is enabled.

According to another embodiment of the present disclosure, there is provided a transmission control method including when an application program calls a connect function, delaying transmission of a SYN packet in response to the calling of the connect function, and upon calling of a transmit function by the application program while the transmission of the SYN packet is being delayed, transmitting the SYN packet including transmission target data in response to the calling of the transmit function.

According to a further embodiment of the present disclosure, there is provided a transmission control program for a computer including by a delaying section, when an application program calls a connect function, delaying transmission of the SYN packet in response to the calling of the connect function, and by a transmitting section, upon calling of a transmit function by the application program while the transmission of the SYN packet is being delayed, transmitting the SYN packet including transmission target data in response to the calling of the transmit function.

DETAILED DESCRIPTION OF THE PREFERRED EMBODIMENT

One preferred embodiment of the present disclosure is explained below with reference to the accompanying drawings.

Figure 1:
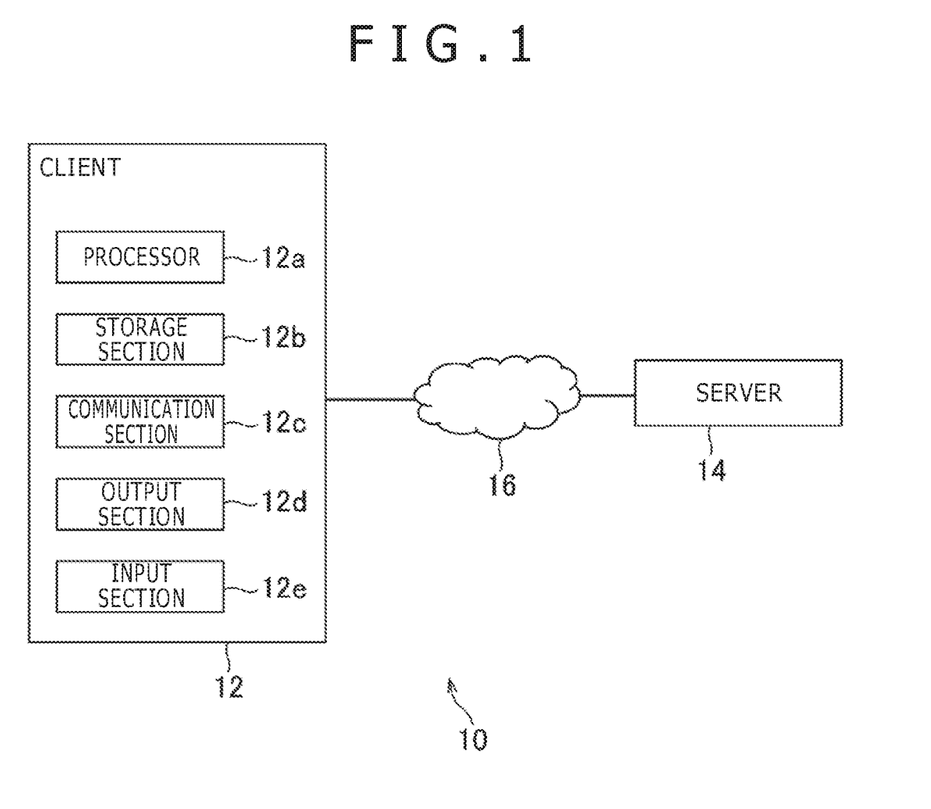
FIG. 1 is a schematic view showing a typical overall configuration of a communication system according to an embodiment of the present disclosure.

FIG. 1 is a schematic view showing a typical overall configuration of a communication system 10 embodying the present disclosure. As shown in FIG. 1, the communication system 10 in the present embodiment includes a client 12 and a server 14. The client 12 and the server 14 communicate with each other via a computer network 16 such as the Internet.

The server 14 in the present embodiment is a web server, for example. The server 14 transmits to the client 12 the data requested thereby.

The client 12 in the present embodiment is typically a game console, a smartphone, a mobile phone, or a computer such as a personal computer.

As shown in FIG. 1, the client 12 in the present embodiment typically includes a processor 12a, a storage section 12b, a communication section 12c, an output section 12d, and an input section 12e. The processor 12a is typically a program-controlled device such as a central processing unit (CPU) that operates in accordance with programs installed in the client 12. The storage section 12b is a storage device such as a read-only memory (ROM) or a random access memory (RAM) or a hard disk drive, for example. The storage section 12b stores programs to be executed by the processor 12a, for example. The communication section 12c is typically a communication interface such as an Ethernet (registered trademark) module or a wireless local area network (LAN) module. The output section 12d is typically made up of a display section that displays information in accordance with commands input from the processor 12a and an audio output section such as speakers that output sounds. The input section 12e is made up of a game controller, a touch pad, a mouse, a keyboard, and a microphone for outputting to the processor 12a the content of operations performed by a user, for example.

The client 12 in the present embodiment has a hardware timer attached thereto or a software timer installed therein, for example. The timer serves to measure the time between timings.

The client 12 in the present embodiment also has application programs and an operating system installed therein. The operating system works as platform software for the installed application programs.

In the present embodiment, the application software installed in the client 12 includes a function for requesting from the server 14 the content stored therein. Before the client 12 transmits a content request to the server 14, communication is established by three-way handshaking between the socket of the client 12 and the socket of the server 14.

In that case, common application software calls a connect function such as a connect ( ) function for connecting to the server 14, before calling a transmit function such as a send ( ) function or a write ( ) function for transmitting data to the server 14. The data to be transmitted to the server 14 such as an HTTP request is set as parameters in the transmit function, for example. These functions may be standard socket application program interface (API) functions, system calls, or library functions.

Figure 2A:
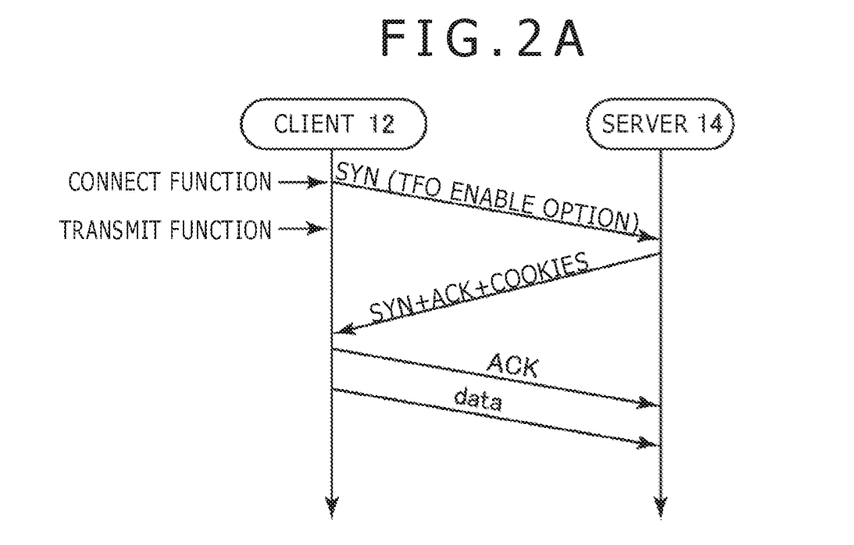
FIG. 2A is an explanatory view explaining an example in which a client transmits data to a server.
Figure 2B:
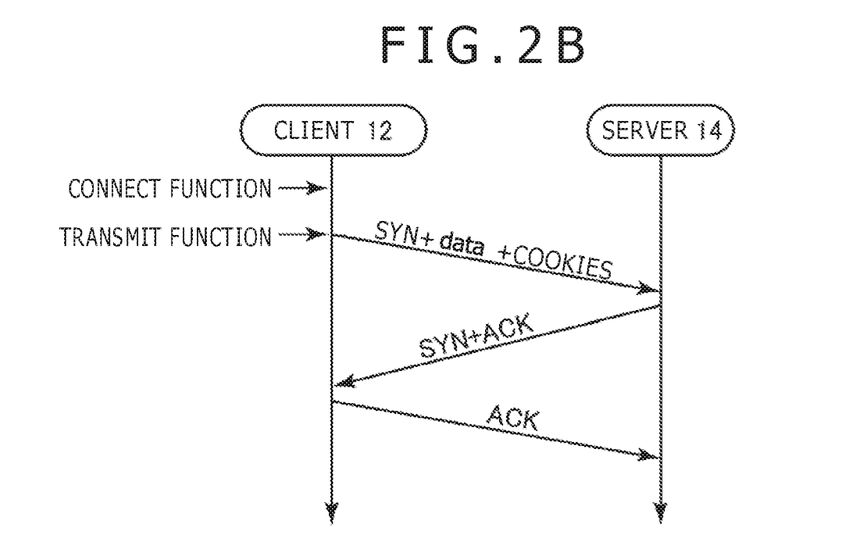
FIG. 2B is an explanatory view explaining another example in which the client transmits data to the server.

Explained below with reference to FIGS. 2A and 2B is how data is transmitted from the client 12 to the server 14 in the present embodiment.

FIG. 2A is an explanatory view explaining an example in which the client 12 transmits data to the server 14.

As shown in FIG. 2A, when the application program calls the connect function, the client 12 in the present embodiment starts three-way handshaking with the server 14. That is, when the application program calls the connect function, the client 12 transmits a SYN packet to the server 14. At this point, the present embodiment permits transmission of the SYN packet that includes a TCP option indicating that the TFO is enabled (the option will be called the TFO enable option hereunder).

Upon normally receiving the SYN packet, the server 14 transmits a SYN+ACK packet to the client 12. At this point, the server 14 supporting the TFO transmits to the client 12 the SYN+ACK packet that includes the cookies defined by the RFC 7413.

In the example of FIG. 2A, it is assumed that the application program calls the transmit function by the time the client 12 receives the SYN+ACK packet. It is also assumed that a transmission socket buffer of the client 12 stores the transmission target data.

Upon normal receipt of the SYN+ACK packet, the client 12 transmits an ACK packet to the server 14. Thereafter, the client 12 transmits one or multiple packets making up the transmission target data to the server 14. In the example of FIG. 2A, as explained above, the application program calls the transmit function by the time the client 12 receives the SYN+ACK packet. Thus the client 12 can transmit the transmission target data to the server 14 at the time the ACK packet is transmitted to the server 14.

If the SYN+ACK packet transmitted from the server 14 includes cookies, the client 12 stores the cookies.

The server 14 receives from the client 12 the transmission target data such as an HTTP request. In turn, the server 14 transmits the requested data to the client 12.

FIG. 2B is an explanatory view explaining another example in which the client 12 transmits data to the server 14. The data transmission shown in FIG. 2B takes place when another TCP connection is established between the client 12 and the server 14 following the data transmission shown in FIG. 2A, for example. The data transmission shown in FIG. 2B also takes place when a TCP connection is again established between the client 12 and the server 14 after the earlier TCP connection therebetween was broken.

As shown in FIG. 2B, the client 12 that stores the cookies received from the server 14 does not transmit a SYN packet to the server 14 even when the application program calls the connect function.

Thereafter, when the application program calls the transmit function, the client 12 transmits to the server 14 a SYN packet that includes the stored cookies and a packet constituting at least part of the transmission target data.

Thereafter, upon receiving the SYN packet normally, the server 14 transmits a SYN+ACK packet to the client 12 as in the example of FIG. 2A. After normally receiving the SYN+ACK packet, the client 12 transmits an ACK packet to the server 14.

In the manner described above, the present embodiment permits communication based on the TFO specifications without modifying the application program. The present embodiment also improves communication rate because the transmission target data is transmitted to the server 14 after the connect function is called and before one RTT elapses in three-way handshaking.

The functions of the client 12 and the processing performed by the client 12 in the present embodiment are described below in more detail.

Figure 3:
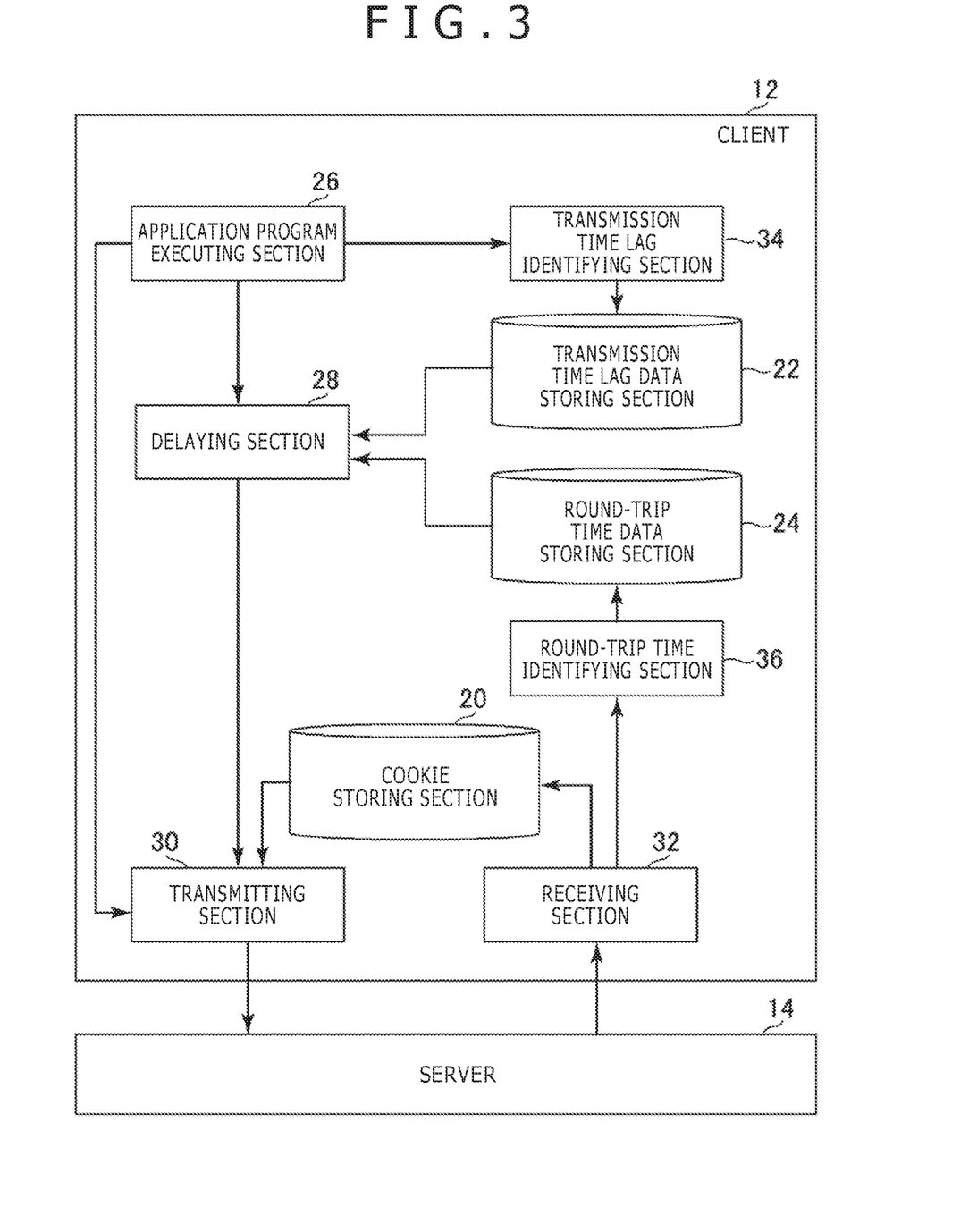
FIG. 3 is a functional block diagram showing typical functions implemented by the client according to the embodiment.

FIG. 3 is a functional block diagram showing typical functions implemented by the client 12 in the present embodiment. Not all functions shown in FIG. 3 need to be implemented by the client 12 in the present embodiment. Also, functions other than the functions in FIG. 3 may be implemented by the client 12.

As shown in FIG. 3, the client 12 in the present embodiment functionally includes a cookie storing section 20, a transmission time lag data storing section 22, a round-trip time data storing section 24, an application program executing section 26, a delaying section 28, a transmitting section 30, a receiving section 32, a transmission time lag identifying section 34, and a round-trip time identifying section 36. The cookie storing section 20, the transmission time lag data storing section 22, and the round-trip time data storing section 24 are implemented mainly by the storage section 12b. The application program executing section 26, the delaying section 28, the transmission time lag identifying section 34, and the round-trip time identifying section 36 are implemented mainly by the processor 12a. The transmitting section 30 and the receiving section 32 are implemented mainly by the communication section 12c. The client 12 in the present embodiment plays the role of a transmission control device that controls the transmission of data to the server 14.

The above-mentioned functions may be implemented by the processor 12a executing a program which is installed in the client 12 working as a computer and which includes the commands representing these functions. This program may be supplied to the client 12 by means of computer-readable information storage medium such as optical disks, magnetic disks, magnetic tapes, magneto-optical disks, or flash memories; or by way of the Internet, for example. The program may be supplied to the client 12 as the programs of the operating system constituting the platform for the application programs to be executed by the client 12.

The cookie storing section 20 in the present embodiment stores the cookies transmitted from the server 14, the cookies being defined by the RFC 7413, for example.

The transmission time lag data storing section 22 in the present embodiment stores transmission time lag data indicative of a transmission time lag, for example. The transmission time lag in this context refers to a time period from the time the connect function is called by the application program until the transmit function is called for the first time. Generally, the transmission time lag is shorter the better the specifications of the client 12 or the smaller the amount of resources used by the client 12. For example, the smaller the number of other application programs being executed by the client 12, the shorter the transmission time lag in general. With the present embodiment, the value of the transmission time lag data, is represented by Tsend of which the initial value is 0, for example.

The round-trip time data storing section 24 in the present embodiment stores round-trip time data indicative of a round-trip time, for example. The round-trip time in this context refers to a time period from the time the SYN packet is transmitted until the SYN+ACK packet is received in three-way handshaking. The round-trip time corresponds to the time required for a round-trip communication to take place between the client 12 and the server 14. The better the communication environment between the client 12 and the server 14, the shorter the round-trip time. With the present embodiment, the value of the round-trip time data is represented by Trtt of which the initial value is 0, for example.

The application program executing section 26 in the present embodiment executes the application programs installed in the client 12, for example. The application program executing section 26 typically functions as the platform for the application programs to be executed by the client 12.

The delaying section 28 in the present embodiment delays the transmission of the SYN packet in response to the calling of the connect function by the application program, for example. If the cookies received from the server 14 are stored in the client 12 as described above, the delaying section 28 in the present embodiment delays the transmission of the SYN packet to the server 14 even when the connect function is called by the application program.

The transmitting section 30 in the present embodiment transmits to the server 14 various packets including those making up the transmission target data, for example.

The receiving section 32 in the present embodiment receives from the server 14 the packets such as those constituting return data in response to an HTTP request, for example.

The transmission time lag identifying section 34 in the present embodiment identifies the above-mentioned transmission time lag, for example. The transmission time lag identifying section 34 typically measures the above transmission time lag and updates the transmission time lag data value Tsend stored in the transmission time lag data storing section 22 to reflect the measured transmission time lag value.

The round-trip time identifying section 36 in the present embodiment identifies the above-mentioned round-trip time, for example. The round-trip identifying section 36 typically measures the above round-trip time and updates the round-trip time data value Trtt stored in the round-trip time data storing section 24 to reflect the measured round-trip time value.

Figure 4:
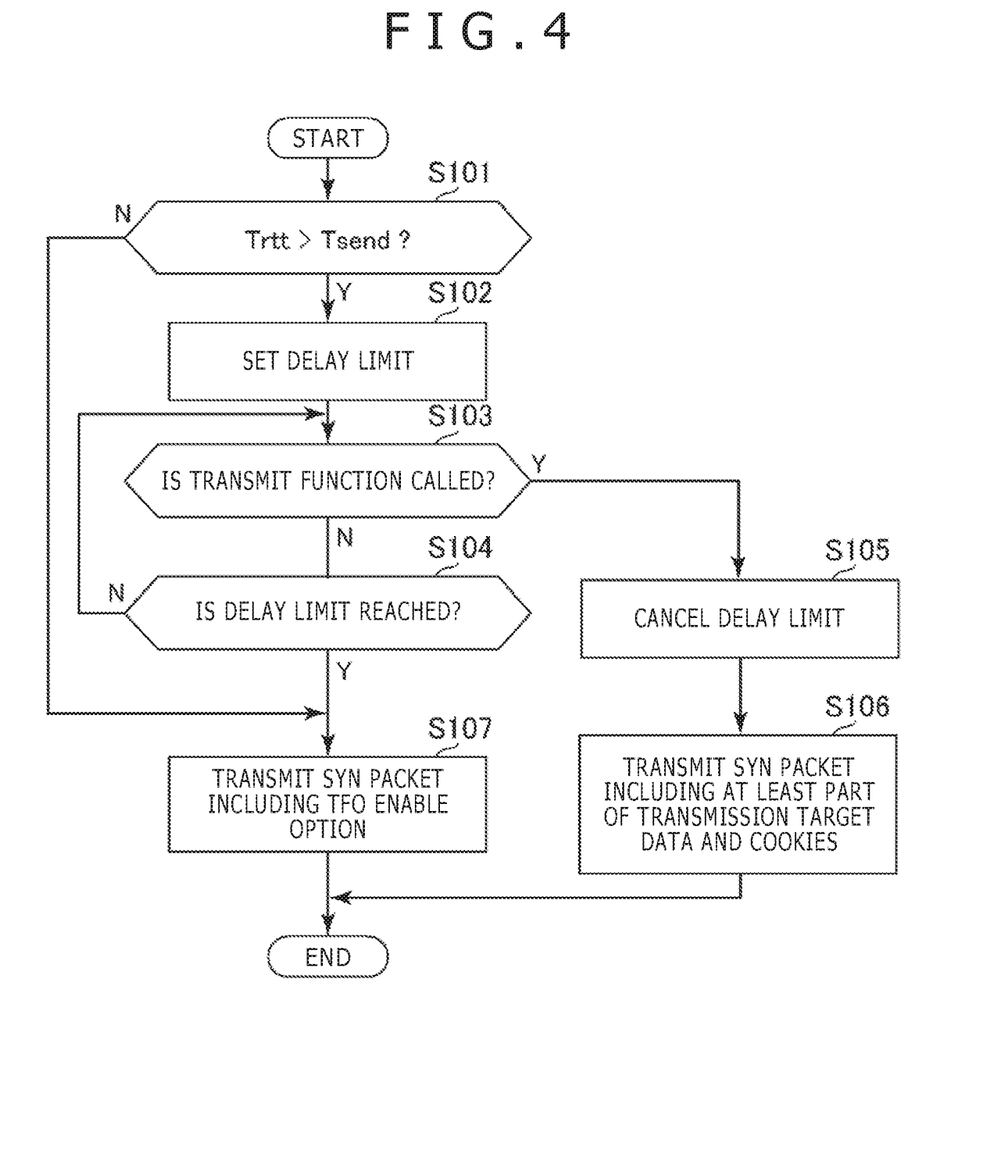
FIG. 4 is a flowchart showing typical processing to be performed by the client according to the embodiment.

Described below with reference to the flowchart of FIG. 4 is a typical flow of SYN packet transmission processing performed by the client 12 in the present embodiment in response to the calling of the connect function by the application program.

The delaying section 28 first performs a comparison between the round-trip time data value Trtt stored in the round-trip time data storing section 24 and the transmission time lag data value Tsend stored in the transmission time lag data storing section 22 (S101).

If the value Trtt is larger than the value Tsend, the delaying section 28 sets as a delay limit the point in time subsequent to the present time by the value Trtt (S102). In this case, the delaying section 28 delays the transmission of packets by the transmitting section 30. In this example, if the round-trip time is longer than the transmission time lag, the delaying section 28 delays the transmission of the SYN packet in response to the calling of the connect function. Also in this example, the transmission of the SYN packet is delayed, at a maximum, from the time the connect function is called until the round-trip time elapses.

The delaying section 28 then determines whether the transmit function is called by the application program (S103), and determines whether the delay limit is reached (S104).

When the transmit function is called, the delaying section 28 cancels the delay limit (S105).

The transmitting section 30 then transmits to the server 14 a SYN packet, that includes at least part of the transmission target data and the cookies stored in the cookie storing section 20 (S106). In this example, as described, when the application program calls the transmit function while the transmission of the SYN packet is being delayed, the transmitting section 30 transmits the SYN packet including the transmission target data in response to the calling of the transmit function. This terminates the processing of this example.

If the value Trtt is determined to be equal to or smaller than the value Tsend in step S101, or if the delay limit is determined to be reached in step S104, the transmitting section 30 transmits the SYN packet that includes the TFO enable option to the server 14 (S107). This terminates the processing of this example.

In the processing example shown, in FIG. 4, the delaying section 28 controls whether or not to delay the transmission of the SYN packet in response to the calling or the connect function in accordance with the result of the comparison between the round-trip time and the transmission time lag in step S101.

If the round-trip time is longer than the transmission time lag, the transmit function is highly likely to be called by the time the SYN+ACK packet is received. In this case, the delaying section 28 delays the transmission of the SYN packet in response to the calling of the connect function by the application program in the processing example of FIG. 4. The transmitting section 30 then transmits the SYN packet that includes the transmission target data in response to the calling of the transmit function by the application program (see FIG. 2B). Thus the transmission target data is transmitted earlier in this case than when the data is transmitted after three-way handshaking (see FIG. 2A).

On the other hand, if the round-trip time is not longer than the transmission time lag, it is highly likely that the transmit function will not be called by the time the SYN+ACK packet is received. In this case, the delay limit is highly likely to be reached while the transmit function has yet to be called. For this reason, in the processing example of FIG. 4, the delaying section 28 limits the delay of SYN packet transmission in response to the calling of the connect function by the application program. The transmitting section 30 transmits the SYN packet the moment the connect function is called. Thus the transmission target data is transmitted earlier in this case than when the transmission of the SYN packet in response to the calling of the connect function is delayed.

In the present embodiment, when the receiving section 32 receives the SYN+ACK packet including cookies from the server 14 following step S107, the transmitting section 30 transmits the ACK packet (see FIG. 2A). Thereafter, the transmitting section 30 transmits to the server 14 one or multiple packets making up the transmission target data. Also, the receiving section 32 stores the received cookies into the cookie storing section 20.

Also in the present embodiment, when the receiving section 32 receives the SYN+ACK packet from the server 14 following step S106, the transmitting section 30 transmits the ACK packet to the server 14 (see FIG. 2B).

Further in the present embodiment, independent of the processing shown in FIG. 4, the transmission time lag identifying section 34 monitors the timing at which the connect function is called by the application program and the timing at which the transmit function is called for the first time. When the transmit function is called for the first time, the transmission time lag identifying section 34 measures the transmission time lag and updates the transmission time lag data value Tsend stored in the transmission time lag data storing section 22 to reflect the measured transmission time lag.

Also in the present embodiment, independent of the processing shown in FIG. 4, the round-trip time identifying section 36 monitors the timing at which the SYN packet is transmitted and the timing at which the SYN+ACK packet is received. Upon receipt of the SYN+ACK packet, the round-trip time identifying section 36 measures the round-trip time. The round trip time identifying section 36 then updates the round trip time data value Trtt stored in the round-trip time data storing section 24 to reflect the measured round-trip time.

The present disclosure is not limited to the embodiment described above.

For example, the communication system 10 may conceivably include multiple servers 14. In such a case, the cookie storing section 20 may store the cookies received from each of the servers 14 in association with identification information identifying each server 14 such as its internet protocol (IP) address. Alternatively, the cookie storing section 20 may store the cookies received from each server 14 in association with the combination of its IP address and its port number, i.e., in relation to identification information identifying the socket of the cookie originator. As another alternative, the cookie storing section 20 may store the cookies received from each server 14 in association with the combination of identifiers identifying the application programs executing the connect function and the transmit function in the client 12.

Likewise, the round-trip time data and transmission time lag data may be managed with regard to each server 14 acting as the communication partner or each socket of the server 14 connected to the socket of the client 12. It is then controlled whether or not to delay the transmission of the SYN packet in response to the calling of the connect function with regard to each server 14 or each server socket.

In another example, the round-trip time data storing section 24 may store the round-trip time data indicative of a round-trip time measured during communication with a given server 14 in association with identification information identifying the server. Also, the round-trip time data storing section 24 may store the round-trip time data indicative of a round-trip time measured during communication with the socket of the server 14 connected to the socket of the client 12 in association with identification information identifying the server socket.

In another example, the transmission time lag data storing section 22 may store the transmission time lag data indicative of a transmission time lag measured during communication with a given server 14 in association with identification information identifying the server. In a further example, the transmission time lag data storing section 22 may store the transmission time lag data indicative of a transmission time lag measured during communication with a given socket of the server 14 connected to the socket of the client 12 in association with identification information identifying the server socket.

In another example, the delaying section 28 may control whether or not to delay the transmission of the SYN packet in a three-way handshaking process to establish connection with each of multiple servers 14. In this case, the delaying section 28 may control whether or not to delay the transmission of the SYN packet in accordance with the result of a comparison between the round-trip time and the transmission time lag during communication with each server 14.

In another examples, the delaying section 28 may control whether or not to delay the transmission of the SYN packet in a three-way handshaking process to establish connection with each of multiple sockets. In this case, the delaying section 28 may control whether or not to delay the transmission of the SYN packet in accordance with the result of a comparison between the round-trip time and the transmission time lag during communication with each socket.

In another example, the delaying section 28 may control whether or not to delay the transmission of the SYN packet in a three-way handshaking process to establish connection with each of multiple application programs communicating with the server 14. In this case, the delaying section 28 may control whether or not to delay the transmission of the SYN packet in accordance with the result of a comparison between the round-trip time and the transmission time lag during communication involving each application program.

In another example, when the number of times the delay limit is reached attains a predetermined count in step S105, the transmitting section 30 may thereafter transmit the SYN packet not including the TFO enable option to the server 14. In a further example, in response to the calling of the connect function by the application program, the transmitting section 30 may transmit the SYN packet not including the TFO enable option to the server 14 without execution of the processing shown in FIG. 4.

The scope of the present disclosure is not limited to HTTP communication. The present disclosure also applies to application protocols other than HTTP.

The present disclosure contains subject matter related to that disclosed in Japanese Priority Patent Application JP 2016-146120 filed in the Japan Patent Office on Jul. 26, 2016, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission control device comprising:
a memory that stores instructions and an application program, and
a processor that is configured to execute the instructions stored in the memory to:
cause the application program to call a connect function,
when the application program calls the connect function, delay transmission of a synchronize packet in response to the calling of the connect function;
cause the application program to call a transmit function,
upon calling of the transmit function by the application program while the transmission of the synchronize packet is being delayed, transmit the synchronize packet including transmission target data in response to the calling of the transmit function,
identify a round-trip time constituting a time period from a time the synchronize packet is transmitted until a synchronize-acknowledge packet is received in three-way handshaking,
identify a transmission time lag constituting a time period from a time the connect function is called by the application program until the transmit function is called, and
control whether or not to delay the transmission of the synchronize packet in response to the calling of the connect function in accordance with a result of a comparison between the round-trip time and the transmission time lag.

2. The transmission control device according to claim 1, wherein the processor controls whether or not to delay the transmission of the synchronize packet in response to the calling of the connect function to connect with each of a plurality of communication devices in accordance with the result of the comparison between the round-trip time and the transmission time lag upon communication with each communication device.

3. The transmission control device according to claim 1, wherein the processor controls whether or not to delay the transmission of the synchronize packet in response to the calling of the connect function to connect with each of a plurality of sockets in accordance with the result of the comparison between the round-trip time and the transmission time lag upon communication with each socket.

4. A transmission control method comprising:
causing an application program to call a connect function,
when the application program calls the connect function, delaying transmission of a synchronize packet in response to the calling of the connect function;
causing the application program to call a transmit function,
upon calling of the transmit function by the application program while the transmission of the synchronize packet is being delayed, transmitting the synchronize packet including transmission target data in response to the calling of the transmit function,
identifying a round-trip time constituting a time period from a time the synchronize packet is transmitted until a synchronize-acknowledge packet is received in three-way handshaking,
identifying a transmission time lag constituting a time period from a time the connect function is called by the application program until the transmit function is called, and
controlling whether or not to delay the transmission of the synchronize packet in response to the calling of the connect function in accordance with a result of a comparison between the round-trip time and the transmission time lag.

5. A non-transitory computer-readable storage medium that stores a computer-executable transmission control program, which, when executed causes a computer to:
cause an application program to call a connect function, wherein when the application program calls the connect function, delaying transmission of a synchronize packet in response to the calling of the connect function;

cause the application program to call a transmit function, and upon calling of the transmit function by the application program while the transmission of the synchronize packet is being delayed, transmitting the synchronize packet including transmission target data in response to the calling of the transmit function, identify a round-trip time constituting a time period from a time the synchronize packet is transmitted until a synchronize-acknowledge packet is received in three-way handshaking, identify a transmission time lag constituting a time period from a time the connect function is called by the application program until the transmit function is called, and control whether or not to delay the transmission of the synchronize packet in response to the calling of the connect function in accordance with a result of a comparison between the round-trip time and the transmission time lag.

* * * * *